A. J. TSCHANTZ.

OIL CAN.

No. 11,223. Reissued Feb. 9, 1892.

Witnesses

W. B. Comer

H. C. Gill

Inventor

Abraham J. Tschantz by W. Bakewell & Son his Attorneys

UNITED STATES PATENT OFFICE.

ABRAHAM J. TSCHANTZ, OF ORRVILLE, OHIO.

OIL-CAN.

SPECIFICATION forming part of Reissued Letters Patent No. 11,223, dated February 9, 1892.

Original No. 451,229, dated April 28, 1891. Application for reissue filed November 10, 1891. Serial No. 412,248.

*To all whom it may concern:*

Be it known that I, ABRAHAM J. TSCHANTZ, a citizen of the United States, residing at Orrville, in the county of Wayne and State of Ohio, have invented certain new and useful Improvements in Oil-Cans, of which the following is a specification.

This invention relates to an improvement in oil-cans, the object being to facilitate lamp-filling by an arrangement whereby the oil is caused to flow from the can by pneumatic force.

With this end in view the invention consists in certain features of construction and combinations of parts described hereinafter, and pointed out in the claims.

Figures 1, 2:
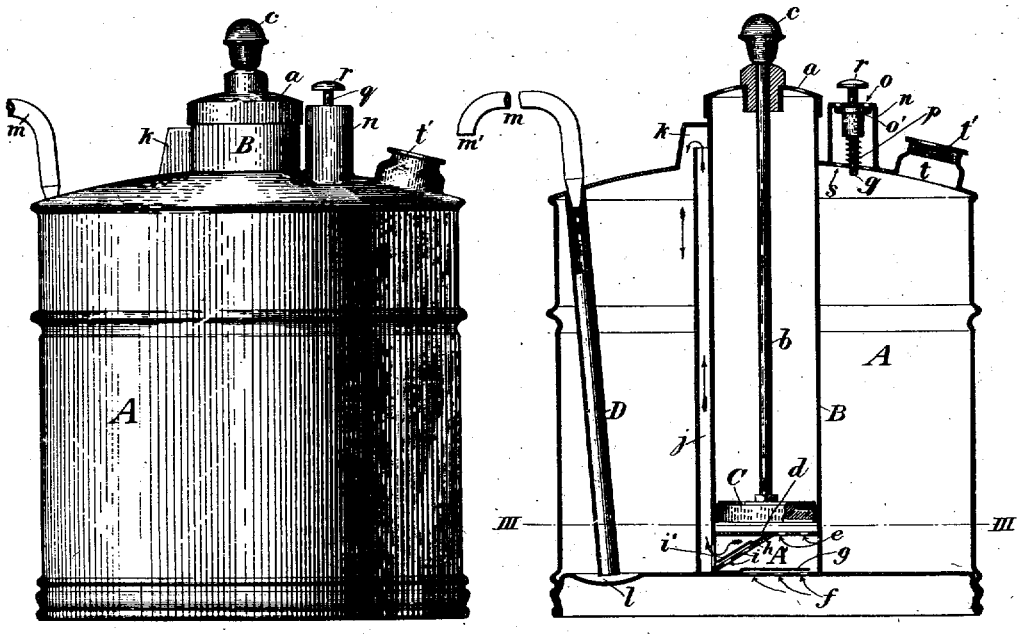
Figure 3:
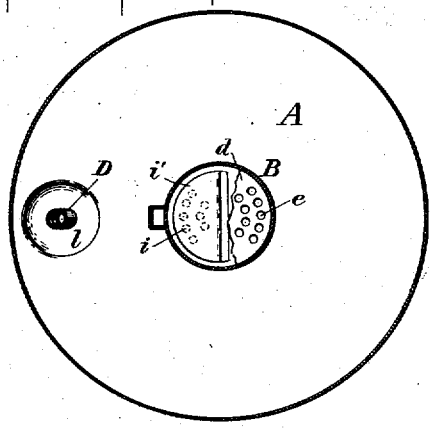

In the accompanying drawings, illustrating the invention, Figure 1 represents a side elevation of the can; Fig. 2, a central vertical section, and Fig. 3 a horizontal cross-section on line III III of Fig. 2.

The reference-letter A designates the can proper, which is provided at the middle with an air-pump comprising a vertical tube or cylinder B, extending from the bottom of the can out of the top of the same and provided with a perforated cap *a* on its upper end. A piston C works in this cylinder and has a rod *b*, which extends through the said cap *a* and has on its projecting end a handle or knob *c*, by means of which it is reciprocated. A horizontal diaphragm *d* extends across the said cylinder near its lower end and is provided at one side with a number of perforations *e*, and the bottom of the chamber A′, formed below this diaphragm, (which is the bottom of the can,) is provided with inlet-perforations *f*, closed on the upper side by a hinged flap-valve *g*. A diagonal plate *h* extends across the said chamber A′, dividing the same, but not extending over the perforations *e* in the diaphragm *d*. This diagonal plate also has perforations *i*, which are closed on the upper side by a hinged flap-valve *i*′, and the chamber on the upper side of the said plate communicates with a vertical tube *j*, extending alongside the cylinder B and opening at its upper end into a dome *k* above the top of the can.

The letter D designates the outlet-pipe, which is located at one side of the can and extends from the bottom of the same to the top. At its lower end this pipe is let down in a basin or sink *l* in the bottom of the can. By this means all the oil can be drawn off and none left in the bottom of the can. A U-shaped nozzle *m* is fitted in the upper end of the pipe D, the downward-curved outer end *m*′ of which is for insertion in the lamp.

An escape-vent or relief-valve is located at the top of the can and comprises a short tube *n*, projecting above the can-top and having a closed top provided with a series of perforations *o*. Inside this tube is a valve *o*′, which is held up against said perforations by a spring *p*. The valve *o*′ is mounted on a rod *q*, on which the said spring is placed. This rod projects through the top of the vertical tube *n* and has a thumb-piece *r* on its end. The said tube has communication with the interior of the can through perforations *s* in the top of the latter.

The can is filled through an opening *t*, closed by a screw-cap *t*′.

The operation of the device is as follows: The operator grasps the handle *c* of the piston-rod and draws the piston up in the cylinder B. This creates a suction which lifts the flap-valve *g* and draws air in through the perforations *f* (which have been thus uncovered) into the chamber A′ and through the perforations *e* in the diaphragm into the cylinder. On the return stroke of the piston the air impelled thereby closes the valve *g* and lifts the flap-valve *i*′ from the perforations *i* in the diagonal plate *h*. The air is thus forced through the said plate *h* and up the vertical tube *j* into the dome *k*, and thence down upon the oil in the can. This air-pressure forces the oil up the outlet-pipe D and out through the nozzle *m* into the lamp. This is continued until the lamp is filled. When it is desired to stop the flow of oil, the operator presses on the thumb-piece *r*, which causes the valve *o*′ to uncover the perforations *o*. The compressed air in the can immediately escapes through these perforations and the flow of oil is instantly stopped, since the pressure upon it has been removed.

It will be observed that with this apparatus lamps can be conveniently filled without spilling and wasting the oil, and the can can be drained of its contents, owing to the location of the lower end of the outlet-pipe in the basin *l*.

If a lamp should be filled too full, the downward-curved nozzle end *m'* is held in the lamp after the relief-valve has been opened, and the surplus oil will be siphoned back into the can by the U-shaped nozzle until the oil in the lamp is lowered to the extremity of the nozzle end *m'*, as will be apparent.

By arranging the pump-barrel in the interior of the can and securing it, as shown, to the top and bottom of the can the can is braced and rendered stronger and more rigid.

Having thus described my invention, what I claim as new, and desire to secure by Letters Patent, is—

1. In an oil-can, the combination of an air-pump comprising a vertical cylinder, a piston and piston-rod therein, a perforated diaphragm across said cylinder, forming a chamber below it, which chamber has a perforated bottom communicating with the atmosphere and a flap-valve over the perforations, a vertical passage from the said chamber to the top of the can, its upper end being in the can, and a perforated partition between the lower end of said passage and the chamber, the perforations in said partition being covered by a flap-valve on the passage side, a discharge-pipe leading from the bottom of the can out of the top thereof, and a relief-valve at the top of the can.

2. In an oil-can, the combination of a central air-pump comprising a vertical cylinder, a piston and piston-rod therein, a perforated diaphragm across said cylinder, forming a chamber below it, which chamber has a perforated bottom communicating with the atmosphere and a flap-valve over the perforations, and a diagonal plate in said chamber having perforations covered by a flap-valve, said plate not extending over the perforations in the said diaphragm, a vertical tube communicating with the upper side of said diagonal plate and extending to the top of the can, the upper end of said tube being in the can, a discharge-pipe leading from the bottom of the can out of the top thereof, and a relief-valve at the top of the can.

3. In an oil-can, the combination of an air-pump comprising a vertical cylinder, a piston and piston-rod therein, a perforated diaphragm across said cylinder, forming a chamber below it, which chamber has a perforated bottom communicating with the atmosphere and a flap-valve over the perforations, a vertical passage from the said chamber to the top of the can, its upper end being in the can, and a perforated partition between the lower end of said passage and the chamber, the perforations in said partition being covered by a flap-valve on the passage side, a discharge-pipe leading from a basin in the bottom of the can out of the top of the latter and having a U-shaped nozzle for insertion in a lamp, and a relief-valve at the top of the can.

4. In an oil-can, the combination of an air-pump comprising a vertical cylinder, a piston and piston-rod therein, a perforated diaphragm across said cylinder, forming a chamber below it, which chamber has a perforated bottom communicating with the atmosphere and a flap-valve over the perforations, a vertical passage from the said chamber to the top of the can, its upper end being in the can, and a perforated partition between the lower end of said passage and the chamber, the perforations in said partition being covered by a flap-valve on the passage side, a discharge-pipe leading from the bottom of the can out of the top of the same, and a vent comprising a tube rising from the top of the can and having a perforated upper end, a spring-actuated valve within said tube closing the perforations in the same, and a push-rod connected with said valve.

5. In an oil-can, the combination, with the can, of an air-pump barrel extending within the can from the top to the bottom and secured thereto at both ends, a piston adapted to be reciprocated within the barrel, a port at the lower end of the barrel communicating with an air-passage leading to the top part of the interior of the can, an air-inlet situate at the base of the barrel and communicating with the external air, an oil-delivery pipe extending from within the can, and a relief-valve, substantially as and for the purposes described.

6. In an oil-can, the combination, with the can, of an air-pump barrel extending within the can from the top to the bottom and secured thereto at both ends, a piston adapted to be reciprocated within the barrel, a passage delivering air from the barrel to the can, an air-inlet, and suitable valves, substantially as and for the purposes described.

7. In an oil-can, the combination, with the can, of an air-pump barrel extending within the can, a piston adapted to be reciprocated within the barrel, a port at the lower end of the barrel communicating with an air-passage leading to the top part of the interior of the can, an air-inlet situate at the base of the barrel and communicating with the external air, and an oil-delivery pipe extending from within the can, substantially as and for the purposes described.

In testimony whereof I have hereunto set my hand this 28th day of October, A. D. 1891.

ABRAHAM J. TSCHANTZ.

Witnesses:
MAX BLOOMBERG,
S. N. COE.